(12) United States Patent
Gassoway

(10) Patent No.: US 7,561,574 B2
(45) Date of Patent: Jul. 14, 2009

(54) METHOD AND SYSTEM FOR FILTERING PACKETS WITHIN A TUNNEL

(75) Inventor: Paul A. Gassoway, Norwood, MA (US)

(73) Assignee: Computer Associates Think, Inc., Islandia, NY (US)

( * ) Notice: Subject to any disclaimer, the term of this patent is extended or adjusted under 35 U.S.C. 154(b) by 499 days.

(21) Appl. No.: 11/361,139

(22) Filed: Feb. 23, 2006

(65) Prior Publication Data

US 2007/0195775 A1 Aug. 23, 2007

(51) Int. Cl.
*H04L 12/28* (2006.01)
*G06F 15/173* (2006.01)

(52) U.S. Cl. ........................ 370/392; 709/225
(58) Field of Classification Search .......... 370/389, 370/392, 401, 428; 709/225; 713/150
See application file for complete search history.

(56) References Cited

U.S. PATENT DOCUMENTS

| | | | |
|---|---|---|---|
| 6,700,891 B1 * | 3/2004 | Wong | 370/401 |
| 6,779,051 B1 * | 8/2004 | Basil et al. | 710/33 |
| 2003/0115328 A1 * | 6/2003 | Salminen et al. | 709/225 |
| 2004/0095912 A1 * | 5/2004 | Gao et al. | 370/338 |
| 2005/0086465 A1 * | 4/2005 | Sapkota et al. | 713/150 |
| 2006/0041742 A1 * | 2/2006 | Oba | 713/151 |

FOREIGN PATENT DOCUMENTS

EP 1 317 115 A2 6/2003

OTHER PUBLICATIONS

"Digital cellular telecommunications systems (Phase 2+); Universal Mobile Telecommunications System (UMTS); General Packet Radio Service (GPRS); Service description; Stage 2 (3GPP TX 23.060 version 6.11.0 Release 6)" ETSI TS 123060 V6.11.0, *Global System for Mobile Communications*, ETSI, Dec. 2005, 214 pages.
PCT Notifications of Transmittal of the International Search Report and the Written Opinion of the International Searching Authority, or the Declaration in International Application No. PCT/US2007/004328, Oct. 19, 2007, 13 pages.

* cited by examiner

*Primary Examiner*—Edan Orgad
*Assistant Examiner*—Hai-Chang Hsiung
(74) *Attorney, Agent, or Firm*—Baker Botts L.L.P.

(57) ABSTRACT

A system for filtering packets includes a first router, a second router, and a packet filter. The first router encapsulates a packet and transmits the encapsulated packet to the packet filter through a first tunnel. The packet filter receives the encapsulated packet through the first tunnel and de-encapsulates the encapsulated packet. The packet filter then determines whether the de-encapsulated packet is undesirable and, in response to determining that the de-encapsulated packet is not undesirable, encapsulates the de-encapsulated packet and transmits the encapsulated-not-undesirable packet to a second router through a second tunnel. The second router receives the encapsulated-not-undesirable packet from the second tunnel and de-encapsulates the encapsulated-not-undesirable packet.

48 Claims, 3 Drawing Sheets

METHOD AND SYSTEM FOR FILTERING PACKETS WITHIN A TUNNEL

BACKGROUND

1. Technical Field

The present disclosure relates to packet filtering and, more specifically, to a method and system for filtering packets within a tunnel.

2. Description of the Related Art

Computer networks are increasingly exposed to potentially harmful network traffic. There are many ways in which this network traffic may threaten the security and/or productivity of an enterprise. As one example, malicious programs such as computer viruses and worms may enter a computer network as network traffic. As another example, the security of sensitive information may be compromised via network traffic.

Tools for protecting computer networks from potentially harmful network traffic include packet filter and intrusion protection systems. These systems may include dedicated hardware devices or software running on a general-purpose computer capable of intercepting incoming and/or outgoing network traffic and determining whether the intercepted traffic is potentially harmful. Potentially harmful network traffic may then be blocked and safe network traffic may be allowed.

One problem with currently available packet filters is that users typically need to replace hardware that is currently routing packets in order to correctly install the packet filter. This often is because most computer networks use dedicated hardware routers that are not able to adapt to running packet filter software that is generally written for general-purpose operating systems and not for dedicated routers. In such cases, the user may therefore elect to replace dedicated routers with a general-purpose computer that is capable of routing traffic and executing packet filter software.

There are significant risks involved with replacing routing hardware. Inexperienced network administrators may improperly configure the new router. Furthermore, the user may discover that the new router is not capable of handling the desired level of network traffic load and network functionality has been disrupted. Because of these risks, users often resist purchasing packet filter products.

SUMMARY

In accordance with the present invention, the disadvantages and problems associated with computer systems have been substantially reduced or eliminated. In particular, a system and method is provided that supports improved techniques for filtering packets.

According to a particular embodiment of the present invention, a system for filtering packets includes a first router, a second router, and a packet filter. The first router encapsulates a packet and transmits the encapsulated packet to the packet filter through a first tunnel. The packet filter receives the encapsulated packet through the first tunnel and de-encapsulates the encapsulated packet. The packet filter then determines whether the de-encapsulated packet is undesirable and, in response to determining that the de-encapsulated packet is not undesirable, encapsulates the de-encapsulated packet and transmits the encapsulated-not-undesirable packet to a second router through a second tunnel. The second router receives the encapsulated-not-undesirable packet from the second tunnel and de-encapsulates the encapsulated-not-undesirable packet.

According to another embodiment of the present invention, a system for filtering packets includes a router and a filter packet. The router encapsulates packets and transmits the encapsulated packets to the packet filter through a first tunnel. The router also receives packets from the packet filter through a second tunnel and de-encapsulates the packets received from the packet filter through the second tunnel. Additionally, the packet filter receives an encapsulated packet from the router through the first tunnel and de-encapsulates the encapsulated packet. The packet filter then determines whether the de-encapsulated packet is undesirable and, in response to determining that the de-encapsulated packet is not undesirable, encapsulates the de-encapsulated packet. The packet filter also transmits the encapsulated-not-undesirable packet to the router through the tunnel.

Technical advantages of certain embodiments of the present invention include the ability to filter packets without replacing currently-installed routing hardware and/or software. Additionally, particular embodiments of the present invention may provide an inexpensive and easy-to-install solution for processing undesirable packets. Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Figure 1:
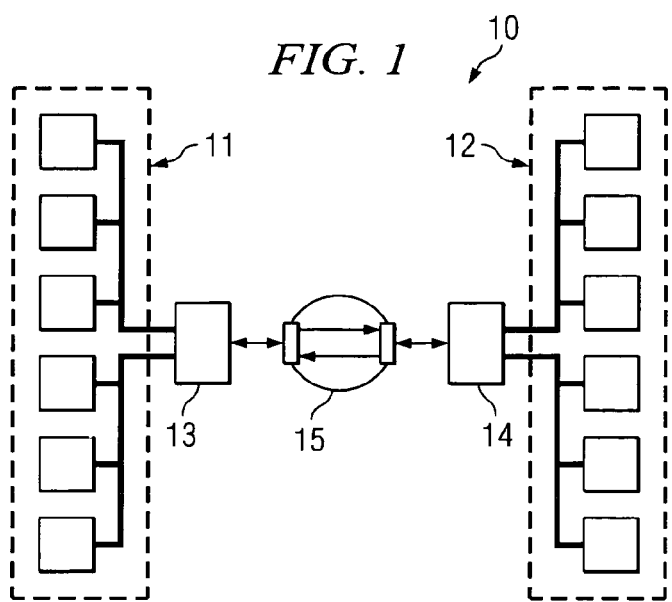
FIG. 1 is a block diagram showing a system for filtering packets according to a particular embodiment of the present disclosure.

In describing the preferred embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

It is often desirable to connect several networks or sub-networks ("subnets"). To implement such a connection, the router for the first subnet may be connected to the router for the second subnet. Routers often use a technique called tunneling to allow packets to travel between routers. For example, a company may wish to joint two Internetworking Packet Exchange (IPX) based networks together. Where the IPX networks are set up to far apart to be readily connected using IPX supported hardware, the router for the first IPX network may exchange packets with the router for the second IPX network using tunneling.

In tunneling, the sending router takes all packets to be sent to the receiving router and encapsulates those packets using a tunnel protocol. The router may be, for example, a CISCO router using CISCO's Internetwork Operating System (IOS) router operating system. Moreover, the router may perform encapsulation, for example, in accordance with the Generic Routing Encapsulation (GRE) protocol. The encapsulated packets are then sent to the receiving router. The receiving router may then de-encapsulate the packets and route them to the appropriate destination on a network associated with the receiving router.

Embodiments of the present disclosure filter packets from within a tunnel. By filtering packets within a tunnel, rather than within a router, the functions of packet routing and packet filtering may occur independently allowing a user to install a packet filter without having to replace preexisting network routing hardware.

FIG. 1 is a block diagram showing a system 10 for filtering packets according to an embodiment of the present disclosure. In the illustrated embodiment, a packet filter 15 is placed between a first router 13 connected to a first subnet 11 and a second router 14 connected to a second subnet 12. Each router 13 and 14 may be configured to point its tunnel at packet filter 15 rather than at one another. In particular embodiments, packet filter 15 may therefore be in a position to filter all packets exchanged between routers 13 and 14.

According to this configuration, a router sending packets to the tunnel may be considered an origin router and the router receiving filtered packets from the packet filter may be considered a destination router. Similarly, the corresponding tunnels may be considered an origin tunnel and a destination tunnel respectively.

Figure 2:
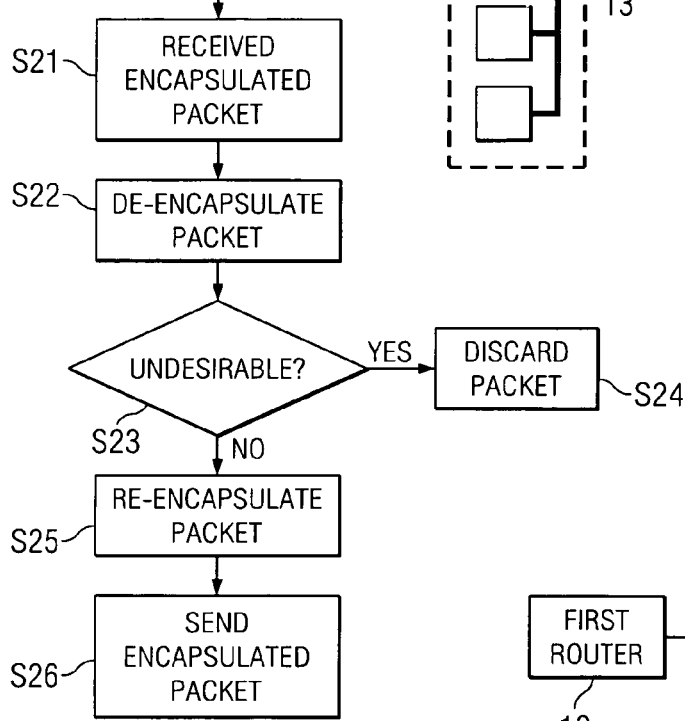
FIG. 2 is a flow chart showing a method for filtering packets using the system shown in FIG. 1, according to a particular embodiment of the present disclosure.

FIG. 2 is a flow chart showing a method for filtering packets using a particular embodiment of system 10 shown in FIG. 1. Packet filter 15 may receive an encapsulated packet (Step S21) from a sending router. Packet filter 15 may then de-encapsulate the packet (Step S22). The de-encapsulated packet may be analyzed to determine if the packet is undesirable (Step S23), for example, the packet may be checked to see if it exhibits a signature of a known undesirable packet. If the packet is determined to be undesirable (Yes, Step S23) then the packet may be discarded (Step S24). However, if the packet is not determined to be undesirable (No, Step S23) then the packet may be re-encapsulated (Step S25) and sent to a receiving router (Step S26).

Figure 3A:
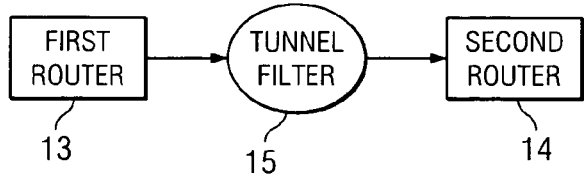
FIGS. 3A-3C are block diagrams showing several network configurations that may use embodiments of the present disclosure.
Figure 3B:
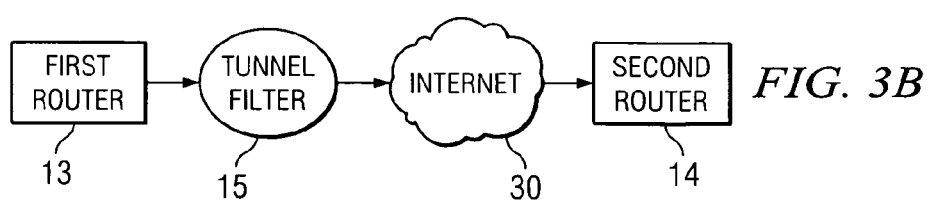
Figure 3C:
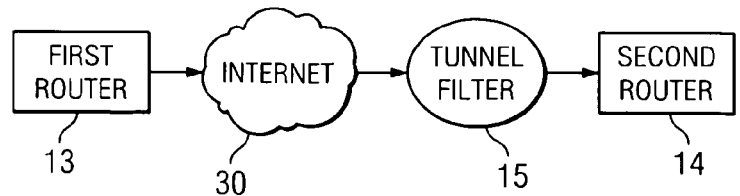

FIGS. 3A-3C are block diagrams showings showing several network configurations that may use embodiments of the present disclosure. Tunnel filter 15, according to a particular embodiment, may be installed in a network that handles traffic between two routers irrespective of whether one of the tunnels goes through the internet. As one example, as seen in FIG. 3A, a first router 13 may be directly connected to tunnel filter 15, and tunnel filter 15 may be directly connected to a second router 14. As another example, as seen in FIG. 3B, first router 13 may be directly connected to tunnel filter 15, and tunnel filter 15 may be connected to a second router 14 over internet 30. As yet another example, as seen from FIG. 3C, first router 13 may be connected to tunnel filter 15 over internet 30, and tunnel filter 15 may be directly connected to second router 14. In general, each of first router 13 and second router 14 may be connected to tunnel filter 15 directly or indirectly through any number of appropriate components.

Figure 4:
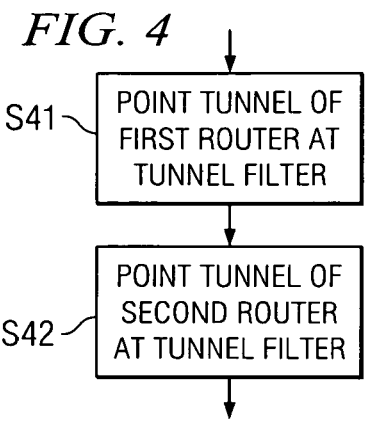
FIG. 4 is a flow chart showing a method for installing a tunnel filter according to a particular embodiment of the present disclosure.

FIG. 4 is a flow chart showing a method for installing a tunnel filter according to an embodiment of the present disclosure. A tunnel of a first router may be pointed to tunnel filter 15 (Step S41). A tunnel of a second router may also be pointed to tunnel filter 15 (Step S42).

Such embodiments of the present disclosure may have minimal impact on network performance. Assuming that tunnel filter 15 has sufficient capability to keep up with the routers, the impact on network performance may be equivalent to an extra hop between routers.

Figure 5:
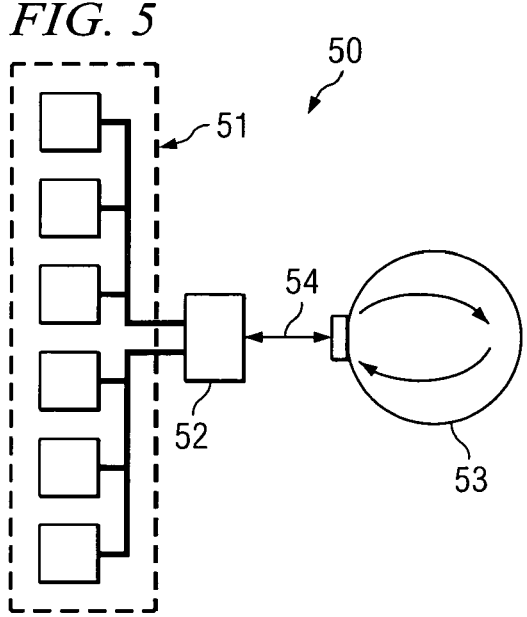
FIG. 5 is a block diagram showing a system for filtering packets according to another embodiment of the present disclosure.

FIG. 5 is a block diagram showing a system 50 for filtering packets according to another embodiment of the present disclosure. In the illustrated embodiment, a subnet 51 is connected to a router 52. The router 52 may then be configured to send arriving packets into a tunnel 54. This may be accomplished, for example, by employing a route policy IOS command to set rules for packets arriving on particular interfaces. As a result, in particular embodiments, router 52 may determine whether to send packets into the tunnel based on the interface on which those packets arrive. The router 52 may be configured such that packets coming from the subnet 51 are sent to the tunnel 54 coupling router 54 to the packet filter 53; while packets returning from the tunnel 54 to the packet filter 53 are not sent to the tunnel 54. This may prevent a perpetual loop.

Figure 6:
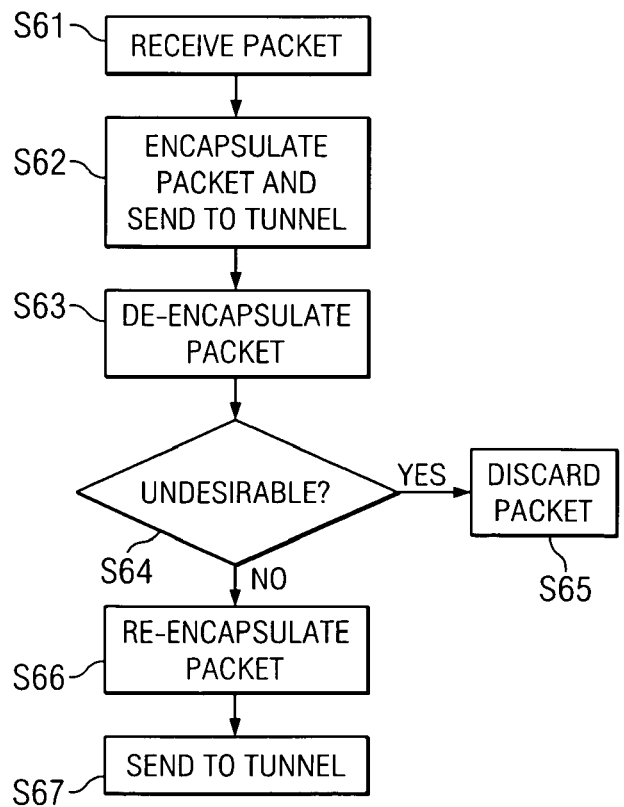
FIG. 6 is a flow chart showing an example method for filtering packets using the system shown in FIG. 5.

FIG. 6 is a flow chart showing a method for filtering packets using a particular embodiment of system 50 shown in FIG. 5. A router may receive a packet from its subnet (Step S61). The router may encapsulate the received packet and send it to a tunnel pointed to a tunnel filter (Step S62). The tunnel filter may receive the encapsulated packet and de-encapsulate the packet (Step S63). The de-encapsulated packet may be analyzed to determine if the packet is undesirable (Step S64), for example, the packet may be checked to see if the packet exhibits a signature of a known undesirable packet. If the packet is determined to be undesirable (Yes, Step S64) then the packet may be discarded (Step S65). However, if the packet is not determined to be undesirable (No, Step S64) then the packet may be re-encapsulated (Step S66) and sent into a tunnel pointed back to the router (Step S67).

Particular embodiments of packet filter 53 may have a small impact on network performance. As router 52 sends and receives each packet twice, this configuration may double the router's utilization. Assuming that the tunnel filter's hardware has sufficient capability to keep up with router 52, the impact on the network performance may, in certain embodiments, be equivalent to adding two extra hops.

An agent-master configuration may be used to implement particular embodiments of the present disclosure. According to such embodiments, an agent may be installed at the packet filter while a master may be installed, for example, remotely. Because the agent/master configuration may serve additional purposes, the packet filter may be implemented as an agent plug-in. Multiple agents may then be used at multiple locations to filter packets according to signatures that may be provided, for example, by the master.

Embodiments of the present disclosure may utilize a pair of tunnels at the interface between router and packet filter/agent. One tunnel may be an incoming tunnel for sending packets from the router to the agent while the other tunnel may be an outgoing tunnel for sending packets from the agent to the router. Both tunnels may use separate tunnel interfaces. This may reduce tunnel interface utilization. The agent may then be configured to filter the outgoing tunnel's interface but not the incoming tunnel's interface. Alternatively, multiple agents may be used to speed up functionality such as, for example, encapsulation and de-encapsulation, for example, one agent for each interface.

Figure 7:
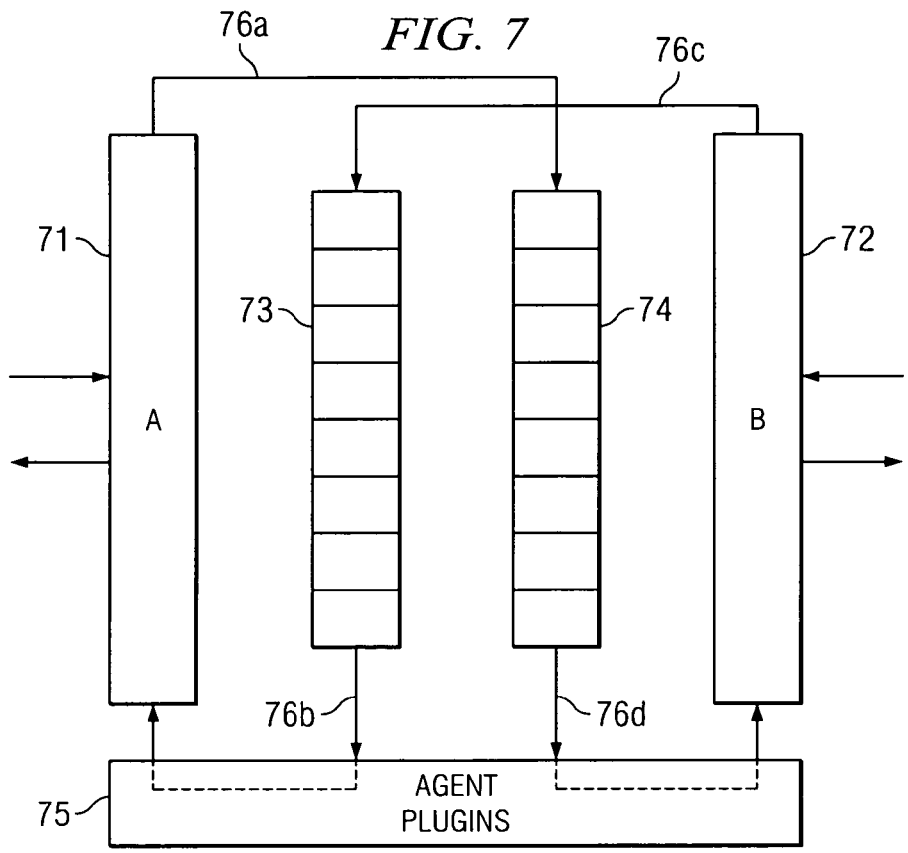
FIG. 7 is a block diagram showing a system for filtering packets according to a particular embodiment of the present disclosure.

FIG. 7 is a block diagram showing a system for filtering packets according to an embodiment of the present disclosure. According to this embodiment, the agent may have four threads 76, two threads for each interface it has been configured to use. Thread 76a may read any queued data from interface 71, strip off the encapsulation protocol header, and place the packet into the packet queue 74 of interface 72. Thread 76d may then take the next packet off of packet queue 74, allow the agent packet filter plug-in 75 to process it, and if the packet is not blocked, re-encapsulate it and send it out on interface 72.

Similarly, thread 76c may read any queued data from interface 72, strip off the encapsulation protocol header, and place the packet into packet queue 73 of interface 71. Thread 76b may then take the next packet off of packet queue 73, allow the agent packet filter plug-in 75 to process it, and if the packet is not blocked, re-encapsulate it and send it out on interface 71.

In addition to filtering out potentially unsafe packets, for example those packets that match an unsafe packet signature, the agent plug-in may send samples of packets to the master. The agent may be configured with the address of the master and the frequency by which to send sample packets. The plug-in may then, when receiving a packet to process, determine if it is time to send a sample packet. If it is determined that it is time to send a sample packet to the master, then a copy of the packet to be processed is encapsulated and sent to the master.

To further enhance system performance, an antivirus product may be used in conjunction with a packet filter of the present disclosure. Then after the antivirus product has been given an opportunity to destroy a threat, the signature associated with that threat may be removed from the agent's list of signatures to check each packet against. This would allow the list of signatures to be finite and small. Therefore, in particular embodiments, the plug-in may be configured to handle a maximum of 20 to 30 signatures at a time.

Figure 8:
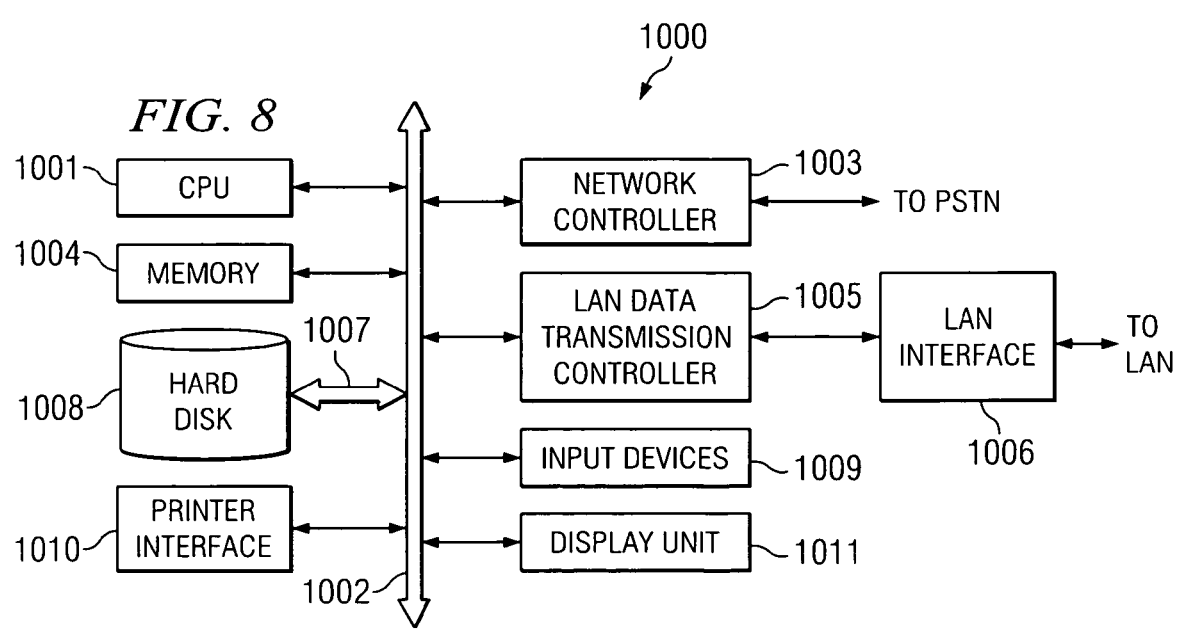
FIG. 8 shows an example of a computer system capable of implementing the method and apparatus according to embodiments of the present disclosure.

FIG. 8 shows an example of a computer system which may implement the method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and/or accessible via a hardwired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

The above specific embodiments are illustrative, and many variations can be introduced on these embodiments without departing from the spirit of the disclosure or from the scope of the appended claims. For example, elements and/or features of different illustrative embodiments may be combined with each other and/or substituted for each other within the scope of this disclosure and appended claims.

What is claimed is:

1. A system for filtering packets transmitted between a first router and a second router, comprising:
    a first router operable to:
        receive a packet;
        determine whether to send the packet into a first tunnel based on an interface on which the first router received the packet;
        encapsulate the packet; and
        transmit the encapsulated packet to a packet filter through the first tunnel;
    a packet filter operable to:
        receive the encapsulated packet through the first tunnel with a first thread associated with an agent application executed by the packet filter;
        de-encapsulate the encapsulated packet with the first thread;
        receive, with the agent application executed by the packet filter, a signature from a remote management application associated with the agent;
        determine whether the de-encapsulated packet is undesirable based on a comparison between the received signature and the de-encapsulated packet; and
        in response to determining that the de-encapsulated packet is not undesirable, encapsulate, with a second thread associated with the agent application, the de-encapsulated packet and transmit, with the second thread, the re-encapsulated packet to a second router through a second tunnel; and
    the second router operable to receive the re-encapsulated packet from the second tunnel and to de-encapsulate the re-encapsulated packet.

2. The system of claim 1, wherein the packet filter is operable to determine whether the de-encapsulated packet is undesirable by comparing the de-encapsulated packet to a set of signatures corresponding to known-undesirable packets.

3. The system of claim 1, wherein the packet filter is further operable to discard the de-encapsulated packet in response to determining that the de-encapsulated packet is undesirable.

4. The system of claim 1, wherein the agent application comprises an agent plug-in incorporated into a multipurpose agent.

5. The system of claim 1, wherein at least one of the first tunnel and the second tunnel travels through at least a portion of the Internet.

6. The system of claim 1, wherein the first router is connected to a first subnet and the second router is connected to a second subnet, and wherein at least a portion of packets transmitted between the first router and the second router comprise packets transmitted between said first subnet and said second subnet.

7. A system for filtering packets from a router, comprising:
    a router operable to:
        receive packets;
        determine whether to send the packets into a first tunnel based on an interface on which the router received the packets;
        encapsulate the packets and transmit the encapsulated packets to a packet filter through the first tunnel; and
        receive packets from the packet filter through a second tunnel and de-encapsulate the packets received from the packet filter through the second tunnel; and
    a packet filter operable to:

receive an encapsulated packet from the router through the first tunnel with a first thread associated with an agent application;

de-encapsulate the encapsulated packet with the first thread;

receive, with an agent application executed by the packet filter, a signature from a remote management application associated with the agent application;

determine whether the de-encapsulated packet is undesirable based on a comparison between the received signature and the de-encapsulated packet; and in response to determining that the de-encapsulated packet is not undesirable, encapsulate, with a second thread associated with the agent application, the de-encapsulated packet and transmit, with the second thread, the encapsulated-not-undesirable packet to the router through the tunnel.

8. The system of claim 7, wherein the router is operable to encapsulate packets and transmit the encapsulated packets by:

receiving the packets;

determining whether the packets have been received from the packet filter; and in response to determining the packets have not been received from the packet filter, encapsulating the packets and transmitting the encapsulated packets to the packet filter through the first tunnel.

9. The system of claim 7, wherein the packet filter is further operable to discard the de-encapsulated packet in response to determining that the de-encapsulated packet is undesirable.

10. The system of claim 7, wherein the packet filter is operable to determine whether the de-encapsulated packet is an undesirable packet by comparing the de-encapsulated packet to a set of signatures corresponding to known-undesirable packets.

11. The system of claim 7, wherein the agent application comprises an agent plug-in incorporated into a multipurpose agent.

12. The system of claim 7, wherein at least one of the first tunnel and the second tunnel travels through at least a portion of the Internet.

13. The system of claim 7, wherein the router is connected to a subnet and wherein encapsulating packets and transmitting the encapsulated packets to the packet filter comprises:

receiving packets transmitted by a first device within the subnet and destined for a second device within the subnet; and encapsulating the packets received from the first device and transmitting the encapsulated packets to the packet filter through the first tunnel.

14. A method for filtering packets transmitted between a first router and a second router, comprising:

receiving a packet at a first router;

determining whether to send the packet into a first tunnel based on an interface on which the first router received the packet;

encapsulating the packet according to one or more encapsulating protocols;

transmitting the encapsulated packet through the first tunnel to a packet filter;

receiving the encapsulated packet at the packet filter through the first tunnel with a first thread associated with an agent application executed by the packet filter;

de-encapsulating the encapsulated packet with the first thread;

de-encapsulating the encapsulated packet at the packet filter;

receiving, with the agent application executed by the packet filter, a signature from a remote management application associated with the agent application;

determining whether the de-encapsulated packet is an undesirable packet based on a comparison between the received signature and the de-encapsulated packet;

in response to determining that the de-encapsulated packet is not an undesirable packet, encapsulating, with a second thread associated with the agent application, the de-encapsulated packet at the packet filter;

transmitting, with the second thread, the encapsulated-not-undesirable packet through a second tunnel to a second router;

receiving the encapsulated-not-undesirable packet at the second router; and de-encapsulating the encapsulated-not-undesirable packet at the second router.

15. The method of claim 14, wherein determining whether the de-encapsulated packet is an undesirable packet comprises comparing the de-encapsulated packet to a set of signatures corresponding to known-undesirable packets.

16. The method of claim 14, further comprising discarding the de-encapsulated packet at the packet filter in response to determining that the de-encapsulated packet is an undesirable packet.

17. The method of claim 14, further comprising installing the packet filter in an existing network that includes the first router and the second router, wherein the first router and second router are operable to communicate packets through tunnels connecting the routers before the packet filter is installed.

18. The method of claim 14, wherein at least one of the first tunnel and the second tunnel travels through at least a portion of the Internet.

19. The method of claim 14, wherein the first router is connected to a first subnet and the second router is connected to a second subnet, wherein at least a portion of packets transmitted between the first router and the second router are packets transmitted between the first subnet and the second subnet.

20. A method for filtering packets from a router, comprising:

receiving a packet at a router;

determining whether to send the packet into a first tunnel based on an interface on which the router received the packet;

encapsulating the packet according to one or more encapsulating protocols;

transmitting the encapsulated packet through a first tunnel to a packet filter;

receiving the encapsulated packet at the packet filter through the first tunnel with a first thread associated with an agent application executed by the packet filter;

de-encapsulating the encapsulated packet at the packet with the first thread;

receiving, with the agent application executed by the packet filter, a signature from a remote management application associated with the agent application;

determining whether the de-encapsulated packet is an undesirable packet based on a comparison between the received signature and the de-encapsulated packet;

in response to determining that the de-encapsulated packet is not an undesirable packet, encapsulating, with a second thread associated with the agent application, the de-encapsulated packet at the packet filter;

transmitting, with the second thread, the encapsulated-not-undesirable packet through a second tunnel to the router;

receiving the encapsulated-not-undesirable packet at the router; and de-encapsulating the encapsulated-not-undesirable packet at the router.

21. The method of claim 20, wherein determining whether the de-encapsulated packet is an undesirable packet comprises comparing the de-encapsulated packet to a set of signatures corresponding to known-undesirable packets.

22. The method of claim 20, wherein encapsulating the packet comprises:

determining whether the packet has been received from the packet filter; and in response to determining that the packet has not been received from the packet filter, encapsulating the packet and transmitting the encapsulated packet to the packet filter through the first tunnel.

23. The method of claim 20, further comprising discarding the de-encapsulated packet in response to determining that the de-encapsulated packet is an undesirable packet.

24. The method of claim 20, wherein the router is connected to a subnet and wherein receiving a packet at the router comprises receiving a packet at the router transmitted by a first device in within the subnet and destined for a second device within the subnet.

25. The method of claim 20, further comprising:

installing the packet filter in an existing network that includes the router, wherein the router is operable to route packets between devices before the packet filter is installed; and configuring the router to transmit at least a portion of the packets received by the router to the packet filter through the first tunnel.

26. The method of claim 20, wherein at least one of the first tunnel and the second tunnel travels through at least a portion of the Internet.

27. A computer system comprising:

one or more processors; and one or more program storage devices readable by one or more of the processors, embodying instructions executable by one or more of the processors, wherein, when executing the instructions the processors are individually or collectively operable to:

receive a packet at a first router;

determine whether to send the packet into a first tunnel based on an interface on which the first router received the packet;

encapsulate the packet according to one or more encapsulating protocols;

transmit the encapsulated packet through a first tunnel to a packet filter;

receive the encapsulated packet at the packet filter through the first tunnel with a first thread associated with an agent application executed by the packet filter;

de-encapsulate the encapsulated packet with the first thread at the packet filter;

receive, with the agent application executed by the packet filter, a signature from a remote management application associated with the agent application;

determine whether the de-encapsulated packet is an undesirable packet based on a comparison between the received signature and the de-encapsulated packet;

in response to determining that the de-encapsulated packet is not an undesirable packet, encapsulate, with a second thread associated with the agent application, the de-encapsulated packet at the packet filter;

transmit, with the second thread, the encapsulated-not-undesirable packet through a second tunnel to a second router;

receive the encapsulated-not-undesirable packet at the second router; and de-encapsulate the encapsulated-not-undesirable packet at the second router.

28. The computer system of claim 27, wherein the processors are further operable to discard the packet in response to determining that the packet is undesirable.

29. The computer system of claim 27, wherein the processors are further operable to determine whether the de-encapsulated packet is undesirable packet by comparing the de-encapsulated packet to a set of signatures corresponding to known-undesirable packets.

30. The computer system of claim 27, wherein said agent application is an agent plug-in incorporated into a multipurpose agent.

31. The computer system of claim 27, wherein at least one of the first tunnel and the second tunnel travels through at least a portion of the Internet.

32. The computer system of claim 27, wherein the first router is connected to a first subnet and the second router is connected to a second subnet and at least a portion of packets transmitted between the first router and the second router are packets transmitted between the first subnet and the second subnet.

33. A computer system comprising:

one or more processors; and one or more program storage devices readable by one or more of the processors, embodying instructions executable by one or more of the processors, wherein, when executing the instructions the processors are individually or collectively operable to:

receive a packet at a router;

determine whether to send the packet into a first tunnel based on the interface on which the packet arrives at the first router;

encapsulate the packet according to one or more encapsulating protocols;

transmit the encapsulated packet through a first tunnel to a packet filter;

receive the encapsulated packet at the packet filter through the first tunnel with a first thread associated with an agent application executed by the packet filter;

de-encapsulate the encapsulated packet with the first thread at the packet filter;

receive, with the agent application executed by the packet filter, a signature from a remote management application associated with the agent application;

determine whether the de-encapsulated packet is an undesirable packet based on a comparison between the received signature and the de-encapsulated packet;

in response to determining that the de-encapsulated packet is not an undesirable packet, encapsulate, with a second thread associated with the agent application, the de-encapsulated packet at the packet filter;

transmit, with the second thread, the encapsulated-not-undesirable packet through a second tunnel to the router;

receive the encapsulated-not-undesirable packet at the router; and de-encapsulate the encapsulated-not-undesirable packet at the router.

34. The computer system of claim 33, wherein the processors are further operable to discard the de-encapsulated packet in response to determining that the de-encapsulated packet is an undesirable packet.

35. The computer system of claim 33, wherein the processors are operable to determine whether the de-encapsulated packet is an undesirable packet by comparing the de-encapsulated packet to a set of signatures corresponding to known-undesirable packets.

36. The computer system of claim 33, wherein said agent application is an agent plug-in incorporated into a multipurpose agent.

37. The computer system of claim 33, wherein the router is connected to a subnet and wherein the processors are operable to receive the packet at the router by receiving a packet at the router transmitted by a first device within the subnet and destined for a second device within the subnet.

38. Computer-readable storage media including computer executable code for filtering packets transmitted between a first router and a second router, comprising:
   code for receiving a packet at a first router;
   code for determining whether to send the packet into a first tunnel based on an interface on which the first router received the packet;
   code for encapsulating the packet according to one or more encapsulating protocols;
   code for transmitting the encapsulated packet through a first tunnel to a packet filter;
   receiving the encapsulated packet at the packet filter through the first tunnel with a first thread associated with an agent application executed by the packet filter;
   code de-encapsulating the encapsulated packet with the first thread at the packet filter;
   code for receiving, with the agent application executed by the packet filter, a signature from a remote management application associated with the agent application;
   code for determining whether the de-encapsulated packet is an undesirable packet based on a comparison between the received signature and the de-encapsulated packet;
   code for encapsulating, with a second thread associated with the agent application, the de-encapsulated packet at the packet filter, in response to determining that the de-encapsulated packet is not an undesirable packet;
   code for transmitting, with the second thread, the encapsulated-not-undesirable packet through a second tunnel to a second router;
   code for receiving the encapsulated-not-undesirable packet at the second router; and
   code for de-encapsulating the encapsulated-not-undesirable packet at the second router.

39. The computer-readable storage media of claim 38, wherein the code for determining whether the de-encapsulated packet is an undesirable packet comprises code for comparing the de-encapsulated packet to a set of signatures corresponding to known-undesirable packets.

40. The computer-readable storage media of claim 38, further comprising code for discarding the de-encapsulated packet at the packet filter in response to determining that the de-encapsulated packet is an undesirable packet.

41. The computer-readable storage media of claim 38, wherein at least one of the first tunnel and the second tunnel travels through at least a portion of the Internet.

42. Computer readable storage media including computer executable code for filtering packets from a router, comprising:
   code for receiving a packet at a router;
   code for determining whether to send the packet into a first tunnel based on the interface on which the router received the packet;
   code for encapsulating the packet according to one or more encapsulating protocols;
   code for transmitting the encapsulated packet through a first tunnel to a packet filter;
   receiving the encapsulated packet at the packet filter through the first tunnel with a first thread associated with an agent application executed by the packet filter;
   code for de-encapsulating the encapsulated packet with the first thread at the packet filter;
   code for receiving, with the agent application executed by the packet filter, a signature from a remote management application associated with the agent application;
   code for determining whether the de-encapsulated packet is an undesirable packet based on a comparison between the received signature and the de-encapsulated packet;
   code for encapsulating, with a second thread associated with the agent application, the de-encapsulated packet at the packet filter in response to determining that the de-encapsulated packet is not an undesirable packet;
   code for transmitting, with the second thread, the encapsulated-not-undesirable packet through a second tunnel to the router;
   code for receiving the encapsulated-not-undesirable packet at the router; and
   code for de-encapsulating the encapsulated-not-undesirable packet at the router.

43. The computer-readable storage media of claim 42, wherein the code for determining whether the de-encapsulated packet is an undesirable packet comprises code for comparing the de-encapsulated packet to a set of signatures corresponding to known-undesirable packets.

44. The computer-readable storage media of claim 42, wherein the code for encapsulating the packet comprises:
   code for determining whether the packet has been received from the packet filter; and
   code for encapsulating the packet and transmitting the encapsulated packet to the packet filter through the first tunnel in response to determining that the packet has not been received from the packet filter.

45. The computer-readable storage media of claim 42, further comprising code for discarding the de-encapsulated packet in response to determining that the de-encapsulated packet is an undesirable packet.

46. The computer-readable storage media of claim 42, wherein at least one of the first tunnel and the second tunnel travels through at least a portion of the Internet.

47. A system for filtering packets, comprising:
   means for receiving a packet at a router;
   means for determining whether to send the packet into a first tunnel based on an interface on which the router received the packet;
   means for encapsulating the packet according to one or more encapsulating protocols;
   means for transmitting the encapsulated packet through a first tunnel to a packet filter;
   receiving the encapsulated packet at the packet filter through the first tunnel with a first thread associated with an agent application executed by the packet filter;
   means for de-encapsulating the encapsulated packet with the first thread at the packet filter;
   means for receiving, with the agent application executed by the packet filter, a signature from a remote management application associated with the agent application;

means for determining whether the de-encapsulated packet is an undesirable packet based on a comparison between the received signature and the de-encapsulated packet;

means for encapsulating, with a second thread associated with the agent application, the de-encapsulated packet at the packet filter in response to determining that the de-encapsulated packet is not an undesirable packet;

means for transmitting, with the second thread, the encapsulated-not-undesirable packet through a second tunnel to the router;

means for receiving the encapsulated-not-undesirable packet at the router; and means for de-encapsulating the encapsulated-not-undesirable packet at the router.

48. A system for filtering packets, comprising:

means for receiving a packet at a first router;

means for determining whether to send the packet into a first tunnel based on an interface on which the first router received the packet;

means for encapsulating the packet according to one or more encapsulating protocols;

means for transmitting the encapsulated packet through a first tunnel to a packet filter;

receiving the encapsulated packet at the packet filter through the first tunnel with a first thread associated with an agent application executed by the packet filter;

means for de-encapsulating the encapsulated packet with the first thread at the packet filter;

means for receiving, with the agent application executed by the packet filter, a signature from a remote management application associated with the agent application;

means for determining whether the de-encapsulated packet is an undesirable packet based on a comparison between the received signature and the de-encapsulated packet;

means for encapsulating, with a second thread associated with the agent application, the de-encapsulated packet at the packet filter, in response to determining that the de-encapsulated packet is not an undesirable packet;

means for transmitting, with the second thread, the encapsulated-not-undesirable packet through a second tunnel to a second router;

means for receiving the encapsulated-not-undesirable packet at the second router; and means for de-encapsulating the encapsulated-not-undesirable packet at the second router.

* * * * *